(12) United States Patent
Gruber et al.

(10) Patent No.: US 7,954,477 B2
(45) Date of Patent: Jun. 7, 2011

(54) DIESEL CYCLE INTERNAL COMBUSTION ENGINE

(76) Inventors: Georg Gruber, Hilpoltstein (DE);
Thomas Kaiser, Denkendorf (DE);
Alois Dotzer, Allersberg (DE)

( * ) Notice: Subject to any disclaimer, the term of this patent is extended or adjusted under 35 U.S.C. 154(b) by 219 days.

(21) Appl. No.: 12/306,263

(22) PCT Filed: Jun. 27, 2007

(86) PCT No.: PCT/EP2007/005689
§ 371 (c)(1),
(2), (4) Date: Dec. 23, 2008

(87) PCT Pub. No.: WO2008/000462
PCT Pub. Date: Jan. 3, 2008

(65) Prior Publication Data
US 2009/0235896 A1  Sep. 24, 2009

(30) Foreign Application Priority Data

Jun. 27, 2006 (DE) .......................... 10 2006 029 350

(51) Int. Cl.
*F02M 37/00* (2006.01)
(52) U.S. Cl. .......................... 123/514; 123/381; 123/510
(58) Field of Classification Search ................. 123/510, 123/514, 516, 381, 543, 554, 557, 575–578
See application file for complete search history.

(56) References Cited

U.S. PATENT DOCUMENTS

| | | | | |
|---|---|---|---|---|
| 3,170,503 A | * | 2/1965 | Druzynski et al. | 137/467.5 |
| 3,402,733 A | * | 9/1968 | McAlvay | 137/467.5 |
| 4,377,149 A | * | 3/1983 | Naylor et al. | 123/557 |
| 4,440,138 A | * | 4/1984 | Smith | 123/557 |
| 4,452,213 A | * | 6/1984 | Duprez | 123/516 |
| 4,454,851 A | * | 6/1984 | Bourbonnaud et al. | 123/557 |
| 4,502,450 A | * | 3/1985 | Duprez | 123/516 |
| 4,502,451 A | * | 3/1985 | Duprez | 123/516 |
| 4,574,762 A | * | 3/1986 | Muller et al. | 123/510 |
| 4,625,701 A | * | 12/1986 | Bartlett et al. | 123/514 |
| 4,770,150 A | * | 9/1988 | Fraenkle et al. | 123/510 |
| 4,893,603 A | * | 1/1990 | Siebels | 123/514 |
| 4,933,093 A | * | 6/1990 | Keller | 210/774 |
| 4,984,554 A | * | 1/1991 | Ariga et al. | 123/516 |
| 5,085,198 A | * | 2/1992 | Bartlett et al. | 123/510 |
| 5,263,456 A | * | 11/1993 | Owen-Evans | 123/495 |

(Continued)

FOREIGN PATENT DOCUMENTS

| | | |
|---|---|---|
| DE | 3710807 | 10/1988 |
| DE | 19714488 | 9/1998 |
| DE | 19725939 | 12/1998 |
| DE | 19736283 | 2/1999 |
| DE | 19750680 | 6/1999 |
| DE | 19845556 | 4/2000 |
| DE | 19902292 | 7/2000 |
| DE | 10145816 | 5/2002 |
| DE | 69909693 | 12/2008 |
| EP | 0411964 | 6/1991 |
| FR | 2540563 | 8/1984 |

*Primary Examiner* — Thomas N Moulis
(74) *Attorney, Agent, or Firm* — Robert A. Sabourin

(57) ABSTRACT

A diesel cycle internal combustion engine can be operated with a variety of fuels having different boiling points and different viscosity-temperature characteristic curves, with a fuel circuit that includes a fuel tank, a fuel pump, a fuel line, at least one fuel filter, a high-pressure pump, an injection system device and a return line to return fuel to the fuel tank, where a control valve is provided in the return line for dividing or diverting the fuel flow to the fuel tank and/or to the fuel filter, and where the fuel division or diversion is undertaken as a function of the viscosity of the fuel in use such that the fuel filter will thence be heated to a temperature based on heat transfer from the fuel in use, and further where a pressure relief valve is provided between the fuel filter and the high-pressure pump.

11 Claims, 1 Drawing Sheet

U.S. PATENT DOCUMENTS

Figure 1:
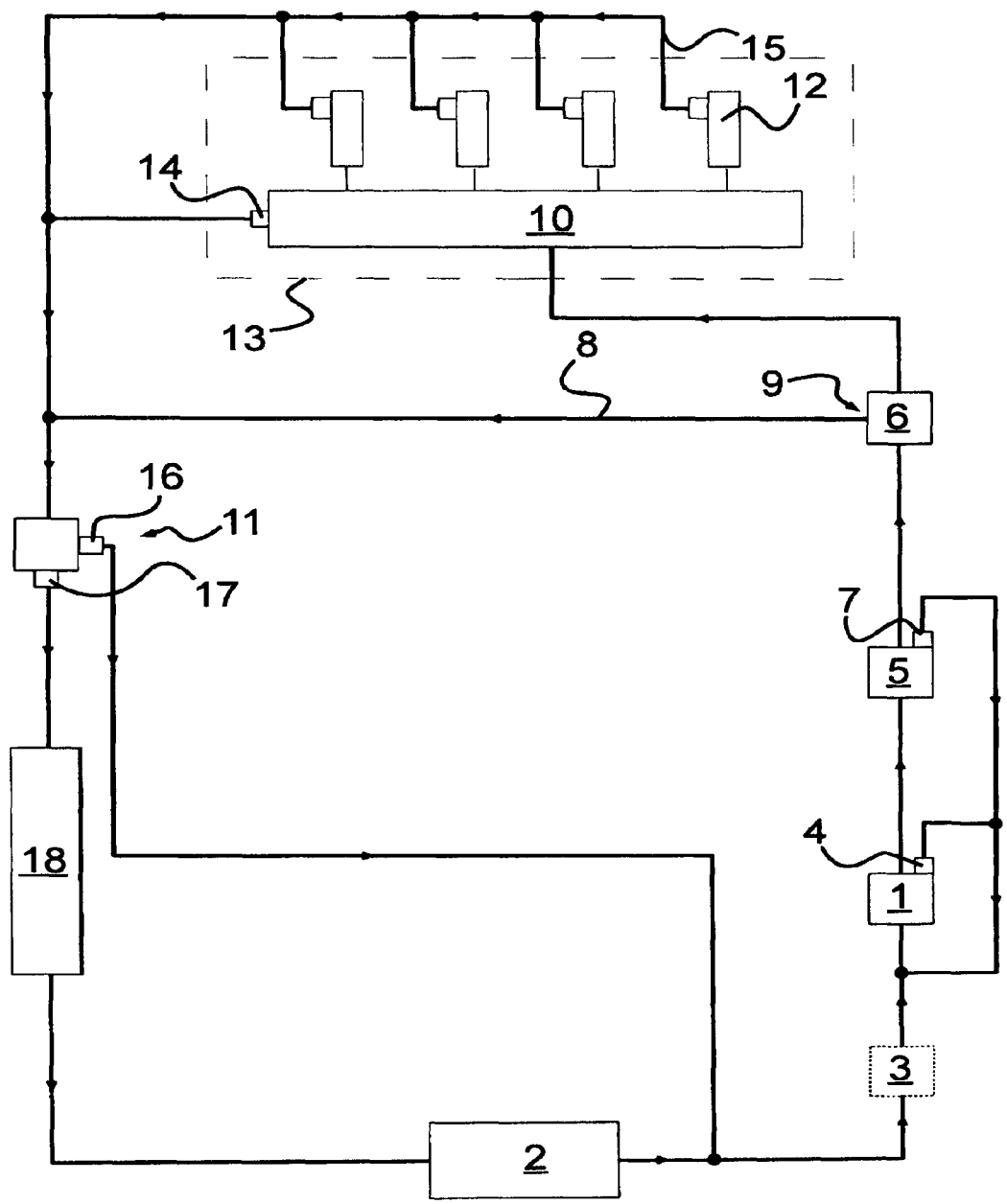

| | | |
|---|---|---|
| 5,411,003 A * | 5/1995 | Eberhard et al. .............. 123/502 |
| 5,533,486 A * | 7/1996 | Qutub .......................... 123/541 |
| 6,615,806 B2 * | 9/2003 | Schueler ....................... 123/514 |
| 6,752,130 B2 * | 6/2004 | Schueler et al. .............. 123/514 |
| 6,868,838 B2 * | 3/2005 | Piet .............................. 123/541 |
| 6,964,267 B2 * | 11/2005 | Jin ............................... 123/514 |
| 7,044,110 B2 * | 5/2006 | Geyer ........................... 123/514 |
| 7,163,003 B2 * | 1/2007 | Bradford ...................... 123/510 |
| 7,192,518 B2 * | 3/2007 | Roesgen ....................... 210/149 |
| 2008/0066721 A1 * | 3/2008 | Friedman ..................... 123/557 |

\* cited by examiner

DIESEL CYCLE INTERNAL COMBUSTION ENGINE

The invention relates to a diesel cycle internal combustion engine according to the preamble of claim 1.

Especially in the case of agricultural machinery, there is increasing interest today in using a fuel that the farmer can produce himself, so that he can better predict its cost. Vegetable oil meets these requirements. Oil crops that guarantee a high yield can be grown in virtually every climatic zone. Pressing can be undertaken in small, decentralized facilities maintained either by the farmer himself, or by an agricultural association—such as, e.g., a machinery cooperative.

However, vegetable oil behaves differently from diesel fuel. While diesel fuel's viscosity remains essentially the same over a wide temperature range, the viscosity of vegetable oil increases with decreasing temperature—depending on the type of oil. In consequence, not only are the viscosity-temperature characteristic curves of vegetable oil and diesel fuel different, but also the individual types of vegetable oil differ quite considerably from one another in this respect. It is necessary to take these different properties into account in the fuel circuit.

Modern diesel cycle internal combustion engines are designed with direct injection, frequently using a common rail injection system. Located between the fuel pump and the high-pressure pump is a fuel filter which traps all particles that could damage the high-pressure pump. Consequently, the fuel filter must have a very fine mesh size in order to be able to ensure this. If the internal combustion engine is to be operated alternately with different fuels, however, the fuel filter must also permit the passage of very viscous fuels, since the high-pressure pump cannot otherwise be adequately supplied.

In order to be able to resolve this conflict, attempts have already been made to heat the fuel filter through a bypass that branches off from the return line to the fuel tank, so that fuel at the same temperature is always present at the fuel filter. However, this has had the result that diesel fuel tends toward the formation of vapor bubbles when the temperature at the fuel filter is set such that viscous vegetable oil can pass with the required volume flow rate.

Similar problems have also occurred with internal combustion engines in which a prefilter is placed ahead of the fuel pump, however. In order to be able to provide the high-pressure pump of the fuel injection system with a uniform supply pressure, it is necessary to use higher quality fuel pumps than in old injection systems. These fuel pumps of the latest generation demand a very pure fuel, since they, much like the high-pressure pumps, would be damaged by impurities. For this reason, it is already common practice to build prefilters into the intake side of the fuel pump, which is to say between the fuel tank and fuel pump; these prefilters remove at least the coarser impurities from the fuel.

Problems also arise with these intake-side prefilters if the internal combustion engine is occasionally operated with diesel fuel or is operated with different types of vegetable oil. The cold, viscous vegetable oil, which is taken directly from the fuel tank, reduces the permeability of the prefilter, thus reducing the delivery rate of the fuel pump. This means that the internal combustion engine does not receive enough fuel to be able to operate at power. On the other hand, heating the fuel to a greater degree poses the risk that diesel fuel, at least, will start to boil.

From EP 0 411 964 A1 has become known an internal combustion engine with a conventional low pressure fuel injection system for operation with diesel fuel. The return to the fuel tank is divided by a throttling device in conjunction with a check valve. This is intended to prevent the fuel filter from becoming blocked by solidified components of the fuel.

FR 2 540 563 A1 discloses a solution to the clogging of pipe systems when paraffinic diesel fuel is used. Through two check valves, the fuel is drawn from the fuel tank or from the return line depending on the underpressure at the fuel pump. In the case of the fuel drawn from the return line, a decision is also made as to whether it is passed through the fuel filter or delivered directly to the fuel pump.

The object of the invention is to design a diesel cycle internal combustion engine such that a variety of fuels can pass through a fuel filter with the necessary volume flow rate while still avoiding the formation of vapor bubbles in any of the fuels.

The object is attained according to the invention by a diesel cycle internal combustion engine with the features of claim 1. As a result of the division of the return from the injection device, warm fuel can be fed to the fuel filter, and does not have to be returned to the tank at all times or in full. The division depends on the viscosity the fuel has when it leaves the injection system. If the fuel taken in by the injection system was very viscous, this circumstance also has an effect on the fuel in the return line downstream of the injection system. Most or all of this still quite viscous fuel is then not returned to the tank, but instead is delivered chiefly to the intake side of the fuel pump. This means that the fuel present at the fuel filter has a higher temperature than the fuel coming from the tank. If the temperature of the fuel in the return line rises and the viscosity decreases, then the quantity returned to the tank also increases, and the volume flow rate delivered directly to the fuel pump is reduced accordingly.

As a result, a mixture of fuel from the return line and fuel from the tank is typically present at the fuel filter. The more the operating temperature of the engine rises, and thus the more the viscosity of the fuel decreases, the larger the quantity of fuel drawn from the tank. This regulation, which depends on the viscosity of the fuel, ensures that warm fuel is already present at the fuel filter shortly after startup, and the internal combustion engine can be operated at high power very soon. At the same time, overheating of the fuel is avoided, since hot and low-viscosity fuel is returned to the tank.

At high ambient temperatures and when diesel fuel or very low-viscosity vegetable oils are being used, virtually all of the internal combustion engine's fuel demand is provided from the tank after some run time, and hardly any fuel from the return line is delivered to the fuel filter. In the case of more viscous vegetable oils, the phase during which fuel is fed to the fuel pump from the return line may last considerably longer. For very viscous fuels and low outdoor temperatures, it can even be the case that a large amount of fuel is supplied to the fuel filter from the return line during the entire operating period, and only a small amount from the tank.

The consequence is that the same filter area is always adequate, regardless of the type of fuel used. Normally, the filter area must be increased for very viscous fuels—for example, by connecting a second fuel filter in parallel—in order to be able to supply the high-pressure pump with the necessary volume. This increases not only the investment costs, but also the service costs for replacement of the fuel filters. The invention now makes it possible to function with the same filter area for all fuels, since for every fuel the filter temperature is set such that the fuel has a viscosity that ensures adequate permeability of the fuel filter.

As a result of the inventive measure, it is even possible to employ a prefilter with a filter size between 30 and 60 µm ahead of the fuel pump. A prefilter with such a small size guarantees that no particles that could damage the fuel pump are allowed to pass through.

A primary filter is always provided on the output side of the fuel pump. This primary filter typically has a filter size between 2 and 5 µm and reliably protects the high-pressure pump from damaging particles.

In advantageous fashion, a pressure relief valve is provided between the fuel pump and the primary filter. This pressure relief valve opens at approximately 2.5 bar (the value is an example; a different opening pressure may be necessary in a different engine) and sends fuel directly back to the fuel pump. Especially in operation with high-viscosity vegetable oil, this prevents the buildup of a high pressure ahead of the primary filter that could destroy the primary filter.

A pressure relief valve is also provided between the primary filter and the high-pressure pump, which likewise sends fuel directly back to the fuel pump. This pressure relief valve opens at about 0.5 bar (the value is an example; a different opening pressure may be necessary in a different engine). This measure achieves the result that approximately the same supply pressure is always present at the high-pressure pump, regardless of the viscosity of the fuel.

The invention may be used in any high-pressure injection system, which is to say also in pump-nozzle systems. However, it is used to particular advantage in a common rail injection system that has an accumulator and one or more injectors.

The control valve device that divides the fuel in the return line into a fuel flow to the tank and a fuel flow to the fuel filter has, according to the invention, a throttling device and a pressure relief valve. The throttling device is located in the part of the return line that accommodates the return flow to the tank. The pressure relief valve regulates the fuel flow to the fuel filter.

If fuel with relatively high viscosity is now present at this control valve device for dividing the fuel flow, then only a small quantity of this viscous fluid flows through the narrow throttling orifice. As a result pressure builds up rapidly, which opens the pressure relief valve. This opens the connection to the fuel filter.

When the temperature of the fuel present at the control valve device rises during operation, the viscosity drops and the fuel, such as vegetable oil, becomes more fluid. The fuel flow through a throttling orifice thus increases as well. As a result, the pressure ahead of the throttling device decreases, and thus also the quantity that flows out through the pressure relief valve to the fuel filter.

In the case of very low-viscosity fuel, it is possible that the entire fuel flow may be diverted by the throttling device to the fuel tank.

In this case, in order to avoid heating a tank containing a small amount of fuel to such a degree that the vapor pressure in the fuel tank becomes too high, the returned fuel can flow through a fuel cooler before it is fed to the fuel tank.

The fuel that is returned from the fuel injection system is especially suitable for supplying the fuel filter with warm fuel shortly after startup. Some of this fuel comes directly from the injectors and—in the case of common rail injection—also from a pressure relief valve that keeps the pressure in an accumulator constant. This fuel has been highly compressed, thus considerably increasing original fuel temperature and reducing fuel viscosity accordingly.

However, it is also possible to use the fuel from a cooling flow branch of the high-pressure pump together with fuel leakage from the high-pressure pump. Here, too, the fuel experiences a considerable temperature increase and is thus suitable for heating the fuel filter.

Ideally, the fuel from the high-pressure pump and the fuel from the injection system are combined with one another and are supplied together to the control valve device for dividing the fuel flow.

Further details and advantages of the invention are evident from the dependent claims in conjunction with the description of an exemplary embodiment, which is explained in detail below with reference to the drawing.

The drawing shows:

FIG. 1 a schematic representation of a fuel circuit of the inventive internal combustion engine.

FIG. 1 schematically shows a fuel circuit of a diesel engine with common rail injection that is run on vegetable oil. The fuel circuit has a fuel pump 1 with pressure relief valve 4, a fuel tank 2, a prefilter 2, a primary filter 5 with pressure relief valve 7, a high-pressure pump 6 with cooling system 9, a cooling flow branch 8, a control valve 11 with pressure relief valve 16 and throttling device 17, a cooler 18 and an injection system 13 with an accumulator 10, four injectors 12, a pressure relief valve 14 and four excess fuel flows 15.

The fuel pump 1 draws fuel out of the tank 2. Located in the tank 2 is a coarse filter—not shown in the drawing—that keeps very large particles, such as rust or dirt particles, in the tank. The permeability of such a coarse filter is reduced only negligibly, even for cold and very viscous vegetable oil, so it need not be heated separately. Before the fuel reaches the fuel pump 1, it is cleaned through the prefilter 3. The prefilter 3 has a filter size of 30 µm. The prefilter 3, like the fuel pump 1, is located outside the tank 2. Alternatively, however, it is also possible to omit the prefilter 3, instead replacing the coarse filter in the fuel tank 2 with a fine filter. The prefilter 3 is shown in dashed lines for this reason.

The fuel pump 1 has a pressure relief valve 4. The pressure relief valve 4 actuates at a pressure greater than or equal to 2.5 bar, and sends the fuel that has been diverted through the pressure relief valve 4 directly back to the intake side of the fuel pump 1. This prevents a high pressure from occurring at the primary filter 5, which could perhaps damage this filter.

The fuel pump 1 delivers the fuel to the high-pressure pump 6 through the primary filter 5. The primary filter 5 has the filter size customarily specified by the manufacturer, namely between 2 and 5 µm. The pressure relief valve 7 of the primary filter 5 actuates at a pressure greater than or equal to 0.5 bar and delivers the fuel directly to the intake side of the fuel pump 1.

On the output side, the high-pressure pump 6 feeds a common rail injection system 13. The high-pressure pump 6 additionally has a cooling system 9. The fuel entering at the intake side of the high-pressure pump 6 is divided into two flow branches, with one flow branch being delivered to the high-pressure section, and the larger flow branch feeding the cooling system 9. After the fuel has exited the high-pressure pump 6, the cooling system 9 delivers it to the inlet side of the control valve 11 through the cooling flow branch 8.

The fuel under high pressure is delivered from the high-pressure pump 6 directly to the accumulator 10. Four injectors 12 are connected to the accumulator 10. The accumulator 10 has a pressure relief valve 14 that sends the fuel diverted therethough directly to the inlet side of the control valve 11. An excess fuel flow 15 occurs at each injector 12. These excess fuel flows 15 are combined, and then likewise delivered to the inlet side of the control valve 11. The control valve 11 has, on the outlet side, a pressure relief valve 16 and a throttling device 17. Fuel that runs through the pressure relief valve 16 is delivered directly to the prefilter 3, or to the intake side of the fuel pump 1 if a prefilter is omitted. Fuel that runs through the throttling device 17 is delivered to the fuel tank 2 through the cooler 18.

The purpose of this arrangement within the fuel circuit is to supply prewarmed fuel as quickly as possible to the fuel filter or filters 3, 5, in particular, so that an electric heater is largely unnecessary. Now, what is special about the control valve 11 is that it does not operate with a temperature sensor, but instead undertakes the division of the fuel flow on the basis of the viscosity of the fuel.

If the fuel is very viscous, the majority of it is diverted through the pressure relief valve 16, since the throttling device 17 has only low permeability to viscous fluids. In this way, fuel that has already been prewarmed is made available to the fuel filter. This "heating process" continues until the returning fuel becomes lower in viscosity. This depends primarily on the type of fuel, and only secondarily on its temperature. Once the returning fuel has the proper viscosity required at the filter, the control valve 11 sends only enough fuel to the filter to allow this condition to be maintained.

The remaining fuel is returned to the tank 2 through the cooler 18. Consequently, the amount of fuel delivered by the control valve 11 to the filter or to the tank depends on the viscosity of the fuel being used. The temperatures of different fuels can differ substantially at the same division rate. In this way, the control valve 11 ensures that fuel at the right temperature and with the right viscosity is always present at the filter. For operation with diesel fuel, this arrangement prevents the diesel fuel from being heated to the extent that it would tend to bubble. At the same time, this arrangement prevents the insufficient heating of very viscous vegetable oil, such as palm oil, which would severely reduce the permeability of the filter. As a result, the appropriate temperature for the fuel being used will always be established at the filter, guaranteeing the correct viscosity of the fuel.

Once the appropriate temperature for the fuel being used has been reached, it is automatically maintained. The control valve 11 returns only as much fuel to the tank as will allow the viscosity of the fuel to be maintained.

LIST OF REFERENCE CHARACTERS

1 Fuel pump
2 Fuel tank
3 Prefilter
4 Pressure relief valve
5 Primary filter
6 High-pressure pump
7 Pressure relief valve
8 Cooling flow branch
9 Cooling system
10 Accumulator
11 Control valve
12 Injector
13 Common rail injection system
14 Pressure relief valve
15 Excess fuel flow
16 Pressure relief valve
17 Throttling device
18 Cooler

The invention claimed is:

1. Diesel cycle internal combustion engine to be operated with a variety of fuels having different boiling points and different viscosity-temperature characteristic curves, with a fuel circuit for circulating a predetermined fuel, the fuel circuit comprising a fuel tank, a fuel pump, a fuel line, a high-pressure pump, a primary fuel filter located between the fuel pump and the high-pressure pump and having a pressure relief valve that accuates at a predetermined pressure to divert fuel to an intake side of the fuel pump, an injection system and a return line to return fuel to the fuel tank, and further comprising a control valve in the return line for dividing a fuel flow of the predetermined fuel to the fuel tank and/or to the fuel pump, wherein the division is undertaken as a function of the viscosity of the predetermined fuel and wherein the control valve comprises a pressure relief valve to divert said predetermined fuel of a predetermined higher viscosity to the intake side of the fuel pump, and a throttling device to divert said predetermined fuel of a predetermined lower viscosity back to the fuel tank.

2. Diesel cycle internal combustion engine according to claim 1, further comprising a prefilter located between the fuel tank and the fuel pump.

3. Diesel cycle internal combustion engine according to claim 2, wherein the primary filter provides a filter size between 2 and 5 um for filtering the predetermined fuel.

4. Diesel cycle internal combustion engine according to claim 1, characterized in that the injection system has an accumulator with one or more injectors.

5. Diesel cycle internal combustion engine according to claim 1, characterized in that said predetermined fuel from the injection system is directed to the control valve.

6. Diesel cycle internal combustion engine to be operated with a variety of fuels having different boiling points and different viscosity-temperature characteristic curves, with a fuel circuit for circulating a predetermined fuel, the fuel circuit comprising a fuel tank, a fuel pump, a fuel line, a high-pressure pump, a primary fuel filter located between the fuel pump and the high-pressure pump and having a pressure relief valve that accuates at a predetermined pressure to divert fuel to an intake side of the fuel pump, an injection system and a return line to return fuel to the fuel tank, and further comprising a control valve in the return line for dividing a fuel flow of the predetermined fuel to the fuel tank and/or to the fuel pump, wherein the division is undertaken as a function of the viscosity of the predetermined fuel, the engine further characterized in that said predetermined fuel from a cooling and leakage flow of the high-pressure pump is directed to the control valve.

7. A diesel cycle internal combustion engine to be operated with a variety of fuels having different boiling points and different viscosity-temperature characteristic curves, the engine including a fuel circuit comprising:
 a fuel tank for supplying fuel to a fuel line;
 a fuel pump, receiving fuel from the fuel tank, with a pressure relief valve that accuates at a first predetermined pressure to divert fuel to an intake side of the fuel pump;
 a primary fuel filter with a pressure relief valve that accuates at a second predetermined pressure to divert fuel to the intake side of the fuel pump;
 a high-pressure pump receiving fuel from the primary fuel filter and dividing the fuel into two branches, one branch delivered to a high-pressure section and the other branch fed to a cooling system;
 an accumulator receiving fuel from the high-pressure section of the high-pressure pump and delivering the fuel to a plurality of injectors; and
 a control valve, receiving fuel from the cooling system branch of the high-pressure pump, including a pressure relief valve to divert fuel of higher viscosity to the intake side of the fuel pump, and a throttling device to divert fuel of lower viscosity back to the fuel tank.

8. The diesel cycle internal combustion engine of claim 7, further comprising a prefilter fuel filter located between the fuel tank and the fuel pump, and receiving both fuel from the fuel tank and the higher viscosity fuel diverted from the pressure relief valve of the control valve.

9. The diesel cycle internal combustion engine of claim 7, wherein the primary filter provides a filter size between 2 and 5 um.

10. The diesel cycle internal combustion engine of claim 8, wherein the prefilter provides a filter size of 30 um.

11. The diesel cycle internal combustion engine of claim 1, wherein said throttling device diverts said predetermined fuel of a predetermined lower viscosity through a cooler, then back to the fuel tank.

* * * * *